US012806978B2

(12) United States Patent
Shirakawa et al.

(10) Patent No.: US 12,806,978 B2
(45) Date of Patent: Nov. 24, 2026

(54) REAR GATE STRUCTURE OF VEHICLE

(71) Applicant: SUBARU CORPORATION, Tokyo (JP)

(72) Inventors: Kouhei Shirakawa, Tokyo (JP); Naohisa Isobe, Tokyo (JP); Kenichirou Takahashi, Tokyo (JP)

(73) Assignee: Subaru Corporation, Tokyo (JP)

( * ) Notice: Subject to any disclaimer, the term of this patent is extended or adjusted under 35 U.S.C. 154(b) by 224 days.

(21) Appl. No.: 18/793,469

(22) Filed: Aug. 2, 2024

(65) Prior Publication Data

US 2025/0083503 A1 Mar. 13, 2025

(30) Foreign Application Priority Data

Sep. 7, 2023 (JP) ................................ 2023-145320

(51) Int. Cl.
*B60J 5/10* (2006.01)

(52) U.S. Cl.
CPC .................................... *B60J 5/107* (2013.01)

(58) Field of Classification Search
CPC ....................................................... B60J 5/107
See application file for complete search history.

(56) References Cited

U.S. PATENT DOCUMENTS 9,834,072 B1 * 12/2017 Alvarez Ruiz .......... B60J 5/101
2014/0167446 A1 * 6/2014 Iwano ...................... B60J 5/107 296/146.8
2015/0210147 A1 * 7/2015 Kodama .................... B60J 5/10 296/146.6
2020/0094658 A1 3/2020 Miyake
2024/0157771 A1 * 5/2024 Plourde, Jr. ............ B60J 5/0479
2025/0368015 A1 * 12/2025 Notoya .................... B60J 5/107

FOREIGN PATENT DOCUMENTS

JP 2010-274688 A 12/2010
JP 2015-067057 A 4/2015
WO WO 2018/110021 A1 6/2018

* cited by examiner

*Primary Examiner* — Yanick A Akaragwe

(74) *Attorney, Agent, or Firm* — McGinn IP Law Group, PLLC

(57) ABSTRACT

A rear gate structure of a vehicle includes an outer panel, an inner panel, an outer peripheral skeleton part, an inner skeleton part, and a stiffening plate. The inner panel is provided inside the vehicle with respect to the outer panel. The outer peripheral skeleton part is formed on the inner panel along an outer peripheral edge of the inner panel. The inner skeleton part is formed on the inner panel. The stiffening plate overlaps a connecting portion between the outer peripheral skeleton part and the inner skeleton part. The stiffening plate includes an outer junction, an inner junction, and a connecting stiffening plate portion. The outer junction overlaps the outer peripheral skeleton part. The inner junction is joined to the inner panel at a portion inward from the inner skeleton part. The connecting stiffening plate portion is joined to the inner panel at the inner skeleton part.

13 Claims, 8 Drawing Sheets

REAR GATE STRUCTURE OF VEHICLE

CROSS-REFERENCE TO RELATED APPLICATIONS

The present application claims priority from Japanese Patent Application No. 2023-145320 filed on Sep. 7, 2023, the entire contents of which are hereby incorporated by reference.

BACKGROUND

The disclosure relates to a rear gate structure of a vehicle.

Some vehicles such as automobiles have a rear gate that opens and closes with respect to a rear opening of a vehicle body.

In the rear gate, it is desirable that an outer panel has a shape conforming to the design of the vehicle, and thus it is difficult to form a skeleton structure for deforming the panel into a hat cross-sectional shape or the like on both an inner panel and an outer panel.

Thus, in the rear gate, basically, the inner panel is deformed into the hat cross-sectional shape or the like, and the skeleton structure is provided only in the inner panel (See for example, Japanese Unexamined Patent Application Publication Nos. 2015-067057 and 2010-274688, and International Patent Application Publication WO 2018/110021 A).

SUMMARY

An aspect of the disclosure provides a rear gate structure of a vehicle. The rear gate structure of a vehicle being configured to open and close a rear opening of a vehicle body of the vehicle. The rear gate structure includes an outer panel, an inner panel, an outer peripheral skeleton part, an inner skeleton part, and a stiffening plate. The outer panel constitutes an outer surface of the vehicle by the rear gate. The inner panel is provided inside the vehicle with respect to the outer panel, at least an outer peripheral edge of the inner panel being joined to the outer panel. The outer peripheral skeleton part is formed on the inner panel along an outer peripheral edge of the inner panel. The inner skeleton part is formed on the inner panel so as to be coupled to the outer peripheral skeleton part with a step inside the outer peripheral skeleton part. The stiffening plate overlaps a connecting portion between the outer peripheral skeleton part and the inner skeleton part. The stiffening plate includes an outer junction, an inner junction, and a connecting stiffening plate portion between the outer junction and the inner junction. The outer junction overlaps the outer peripheral skeleton part, and is joined to the inner panel at the outer peripheral skeleton part. The inner junction is joined to the inner panel at a portion inward from the inner skeleton part. The connecting stiffening plate portion is joined to the inner panel at the inner skeleton part.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
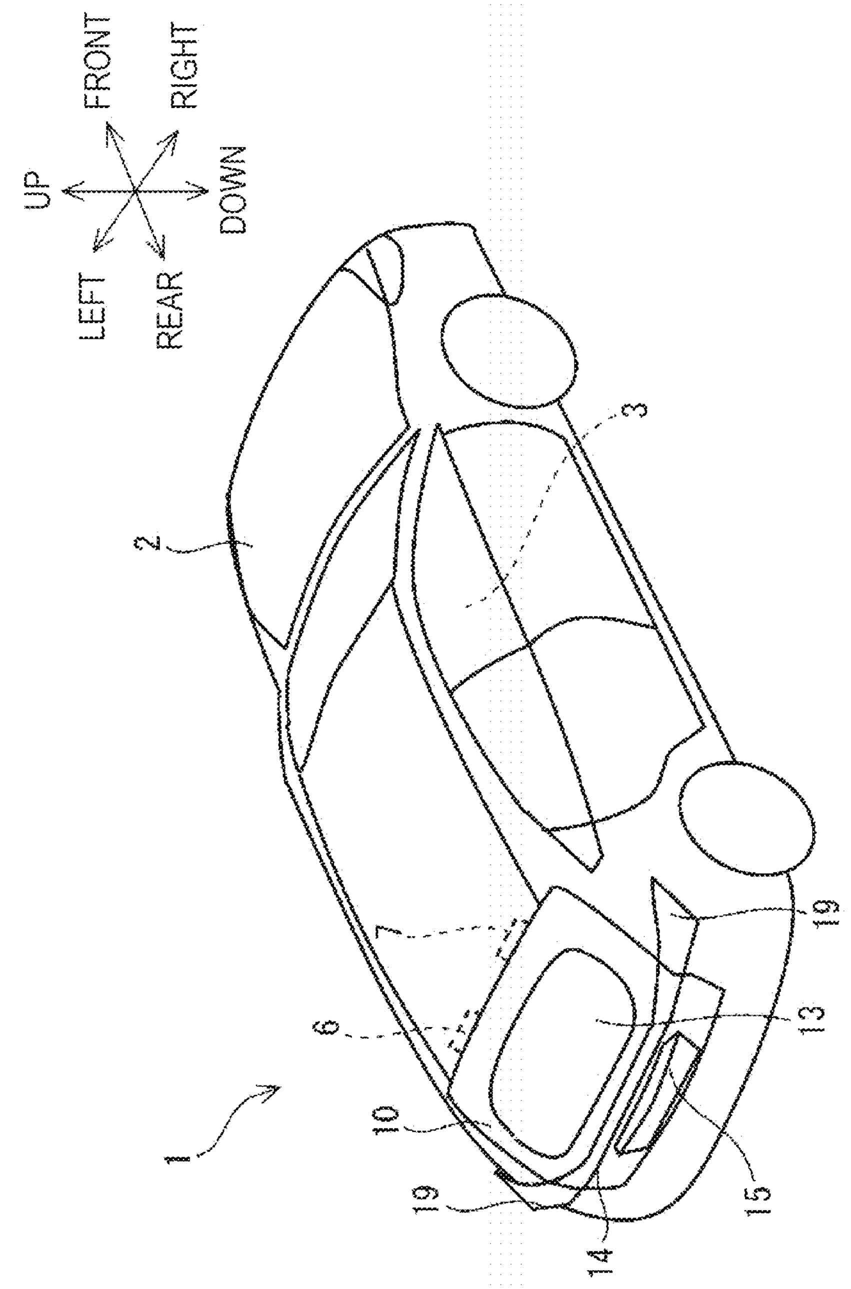
FIG. 1 is a perspective view of an automobile according to an embodiment of the disclosure.

Even if a skeleton structure of a rear gate is formed by deforming an inner panel to increase rigidity, it is not easy to obtain high rigidity, for example, when a hat cross-sectional shape of the inner panel and a hat cross-sectional shape of an outer panel are overlapped.

As a result, the rear gate may give an impression of insufficient rigidity to an occupant who opens and closes the rear gate.

In the following description, up-down, left-right, and front-rear directions refer to directions in the vehicle in a state where the rear gate is closed.

For example, when closing the open rear gate, the occupant pulls down a lower edge central portion of the open rear gate by hand. In order to provide rear glass in the rear gate, glass openings are formed in an upper portion of the inner panel and an upper portion of the outer panel. The input of the lower edge central portion of the rear gate may cause the rear gate to flex in such a manner that its lower portion bends relative to its upper portion. In addition, in the upper portion of the rear gate, when the skeleton part is formed only in the inner panel vertically on both left and right sides of the glass opening, the upper portion itself of the rear gate can bend and flex by the input of the lower edge central portion of the rear gate.

Other than this, for example, when closing the open rear gate, the occupant may pull down a lower edge left end portion or a lower edge right end portion of the rear gate instead of a lower edge central portion. The left and right portions of the lower portion of the rear gate may flex so as to be twisted relative to, for example, a central portion of the lower portion of the rear gate. In addition, due to an input of a rotational force around upper and lower axes at the center in the vehicle width direction with respect to the rear gate, an undesirable force in a direction different from a movable direction may act on a cylinder member coupling left and right edges of the rear gate and the vehicle body and a hinge member that supports an upper edge of the rear gate so as to be openable and closable on the vehicle body.

As described above, the rear gate of the vehicle is required to increase rigidity of the rear gate while ensuring the design of the rear gate.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a perspective view of an automobile 1 according to the embodiment of the disclosure.

Figure 2:
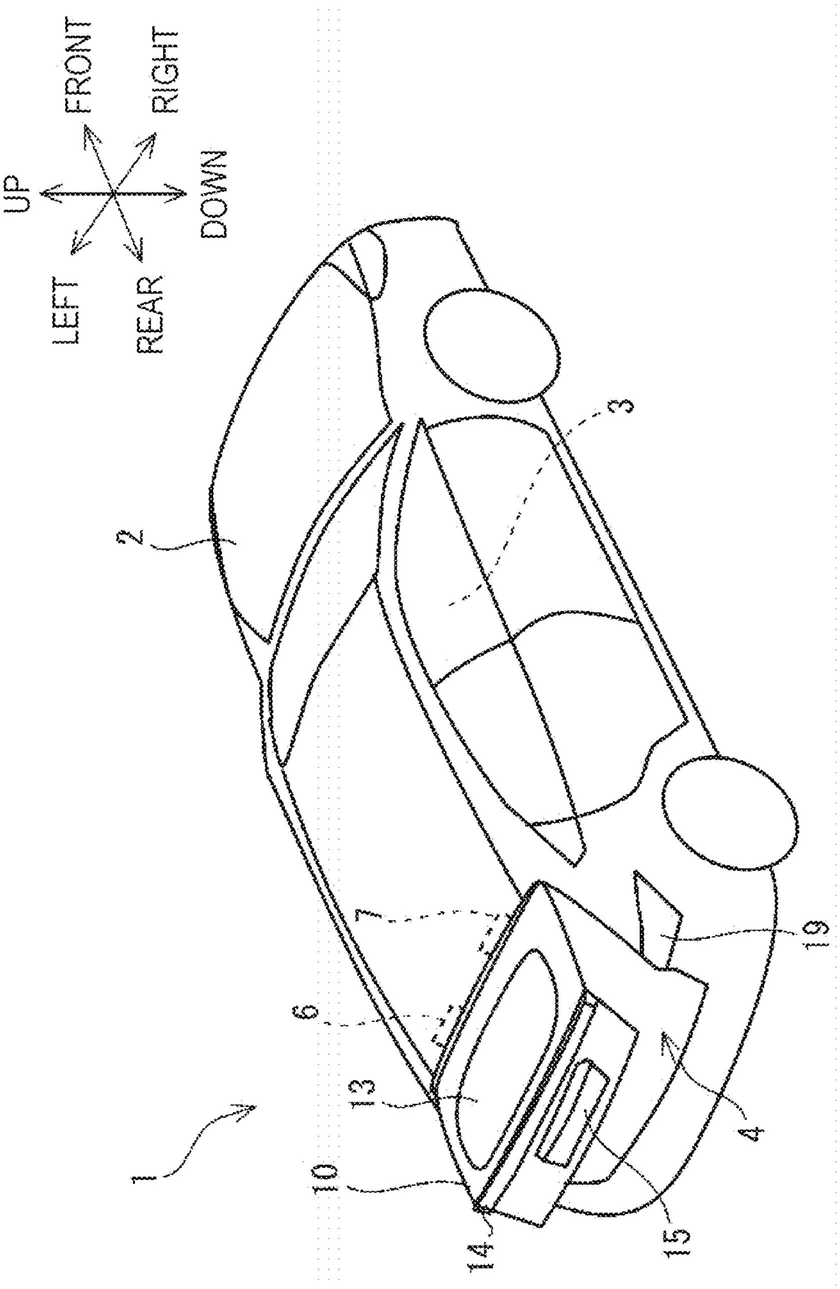
FIG. 2 is a view illustrating a state in which a rear gate of the automobile in FIG. 1 is opened.

FIG. 2 is a view illustrating a state in which a rear gate 10 of the automobile 1 in FIG. 1 is opened.

In the present embodiment, front-rear, left-right, and up-down directions are indicated in a state in which the rear gate 10 is closed as illustrated in FIG. 1. Further, the vehicle width direction of the automobile 1 refers to a left-right direction.

An automobile 1 in FIGS. 1 and 2 is an example of a vehicle. The automobile 1 has a vehicle body 2 in which a cabin is defined. The automobile 1 includes doors for allowing an occupant to get on and off the cabin, and the rear gate 10 for accessing a luggage room which is a rear portion of the cabin. An upper edge portion of the rear gate 10 is attached to a roof of the vehicle body 2 by a left hinge member 6 and a right hinge member 7. As illustrated in FIGS. 1 and 2, the rear gate 10 can be opened and closed with respect to the rear opening 4 of the vehicle body 2.

When the rear gate 10 is opened, the rear opening 4 appears in the vehicle body 2 of the automobile 1 as illustrated in FIG. 2. The occupant can take in and out luggage in the luggage room from the rear opening 4.

Further, the occupant pulls down and closes the open rear gate 10. The rear opening 4 of the vehicle body 2 of the automobile 1 is closed. The luggage in the luggage room does not fall off from the rear opening 4.

Note that the appearance of the automobile 1 illustrated in FIGS. 1 and 2 is a preferable design in which a curved surface shape is frequently used including an outer surface of the rear gate 10. The rear gate 10 is in harmony with left and right tail lamp members 19, which are other parts of the automobile 1, and the design of the automobile 1 is unified as a whole.

Figure 3:
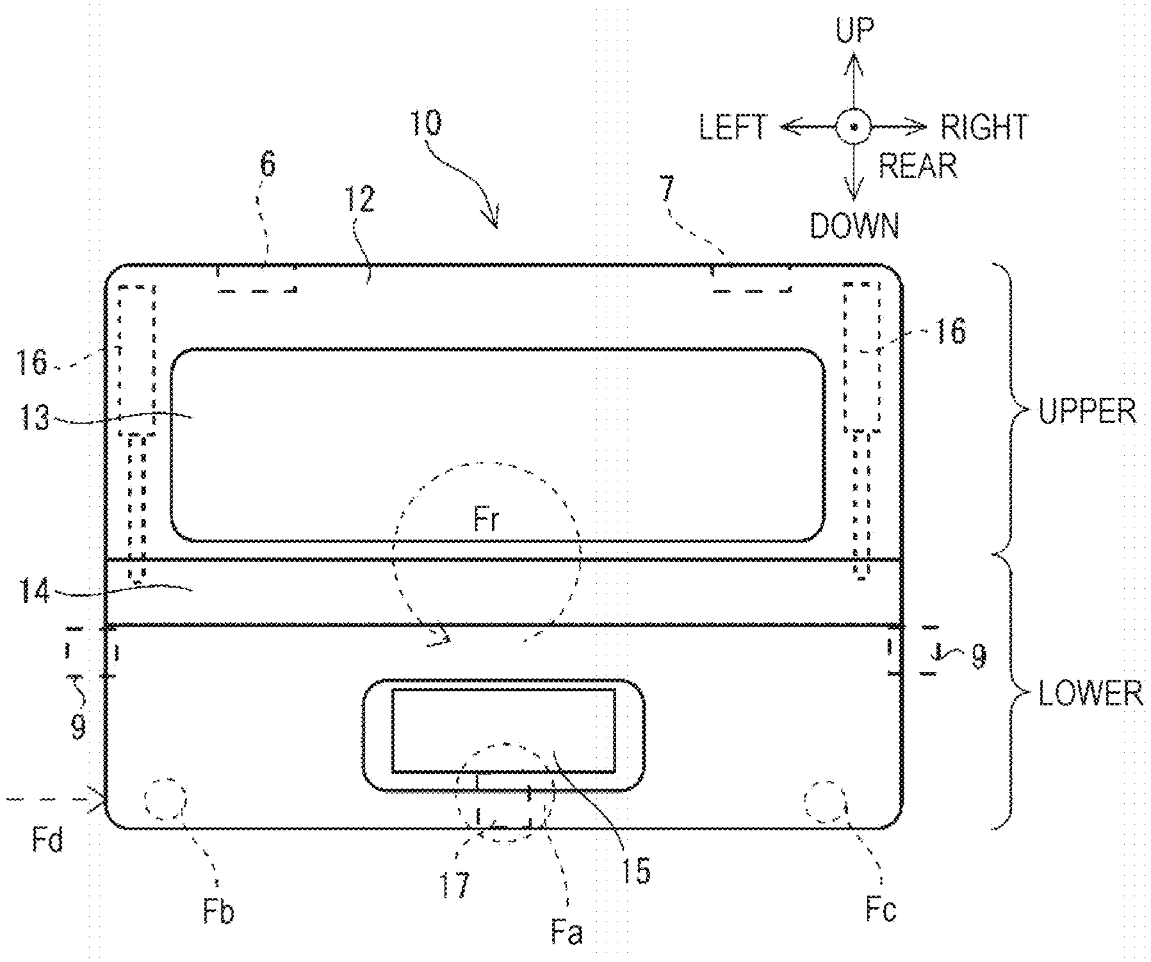
FIG. 3 is a schematic explanatory view of the rear gate of FIG. 1 as viewed from behind.

FIG. 3 is a schematic explanatory view of the rear gate 10 of FIG. 1 as viewed from the rear.

Figure 4:
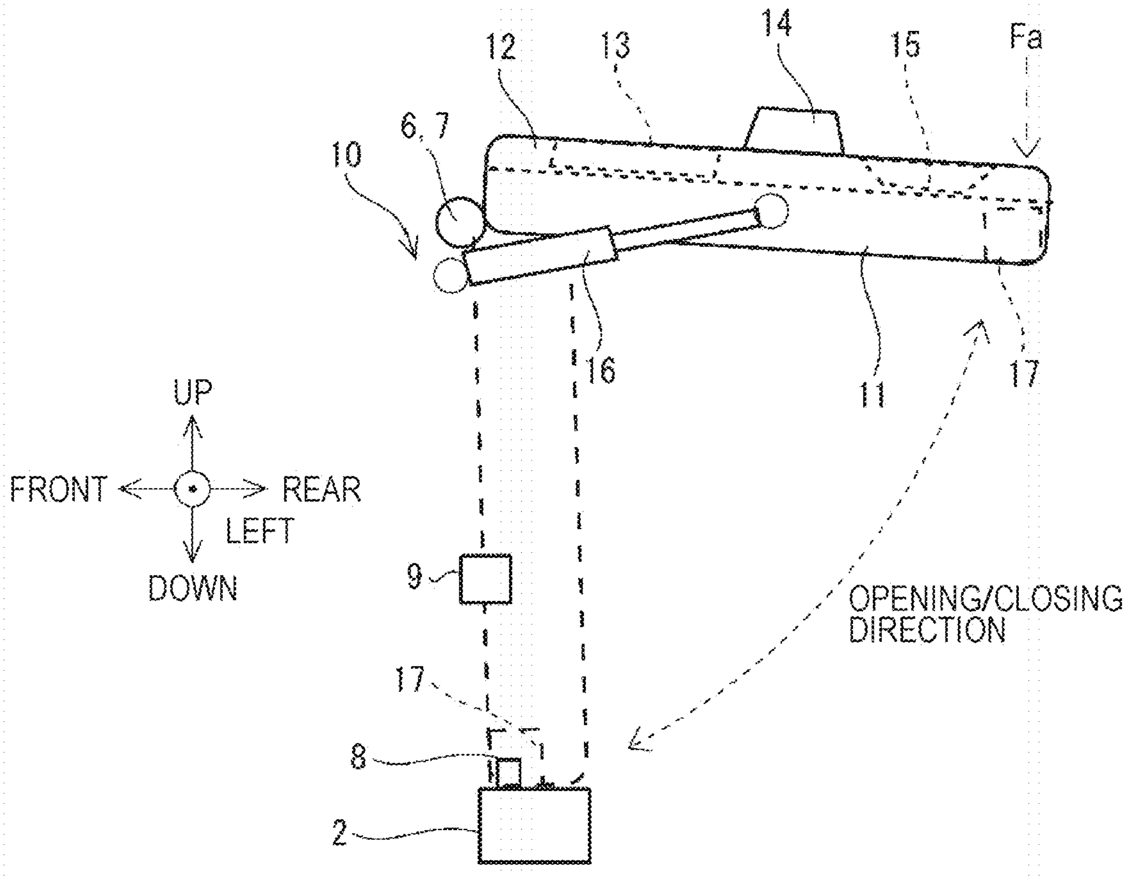
FIG. 4 is an explanatory view of a schematic open/close state of the rear gate of FIG. 3.

FIG. 4 is an explanatory view of a schematic open/close state of the rear gate 10 of FIG. 3.

As illustrated in FIG. 4, the rear gate 10 of the automobile 1 includes an outer panel 12 and an inner panel 11.

As schematically illustrated in FIG. 3, the outer panel 12 may have a shape based on a substantially quadrangular outer shape.

The inner panel 11 is provided on the front side of the automobile 1 with respect to the outer panel 12. The inner panel 11 may be formed in a substantially quadrangular outer shape similar to that of the outer panel 12.

The outer panel 12 and the inner panel 11 are formed in substantially the same outer shape, and outer peripheral edges thereof are joined to each other. Thus, a basic structure of the rear gate 10 is formed.

The left hinge member 6 and the right hinge member 7 are attached to the upper edge of the rear gate 10. The rear gate 10 is pivotally supported by the left hinge member 6 and the right hinge member 7 so as to be openable and closable with respect to the rear opening 4 of the vehicle body 2.

A left cylinder member 16 as a coupling member is provided at the left edge of the rear gate 10. An upper end of the left cylinder member 16 is attached to the vehicle body 2. A lower end of the left cylinder member 16 is attached to a central portion in the up-down direction of the left edge of the rear gate 10.

A right cylinder member 16 as a coupling member is provided at the right edge of the rear gate 10. An upper end of the right cylinder member 16 is attached to the vehicle body 2. A lower end of the right cylinder member 16 is attached to a central portion in the up-down direction of the right edge of the rear gate 10.

When the rear gate 10 is opened as illustrated in FIG. 2, the left cylinder member 16 and the right cylinder member 16 support either the left or right edge of the rear gate 10 on the vehicle body 2 of the automobile 1. Thus, even when the hand is released from the rear gate 10, the rear gate 10 can be maintained in the open state.

A striker member 17 is provided at a lower edge of the rear gate 10. The striker member 17 is provided at a center in the left-right direction with respect to the lower edge of the rear gate 10. Further, as illustrated in FIG. 4, the vehicle body 2 is provided with a latch member 8 at a lower central portion of the rear opening 4.

When the rear gate 10 is closed, the striker member 17 is engaged with the latch member 8 as indicated by an alternate long and short dash line in FIG. 4. Thus, the rear gate 10 can be maintained in a closed state.

Further, as illustrated in FIG. 3, the vehicle body 2 is provided with a pair of elastic members 9. The pair of elastic members 9 is provided at a central portion in the up-down direction at the left edge and the right edge of the rear opening 4 of the vehicle body 2. Thus, the left edge and the right edge of the closed rear gate 10 hit the pair of elastic members 9. The closed rear gate 10 is less likely to rattle due to vibration or the like during traveling of the automobile 1.

In the outer panel 12, as illustrated in FIG. 3, a rear glass 13 is fitted into an upper glass opening portion, and a plate attachment surface 15 for attaching a license plate is formed at a lower center. Further, a garnish member 14 is attached between the rear glass 13 and the plate attachment surface 15. The garnish member 14 of the present embodiment is formed to have a width similar to that of the outer panel 12, and is attached to the outer panel 12 so as to cross the entire width in the left-right direction at a center in the up-down direction of the outer panel 12. The left and right tail lamp members 19 are provided on left and right sides of the garnish member 14 of the vehicle body 2.

Then, the outer panel 12 and the garnish member 14 are formed in a curved shape in which a central portion in the vehicle width direction protrudes, for example, for a design of a rear surface of the automobile 1. The outer panel 12, together with the garnish member 14 and the left and right tail lamp members 19, is designed in a shape conforming to the design of the automobile 1 in order to constitute an outer surface on the rear side of the automobile 1 by the rear gate 10.

Thus, in the rear gate 10, the inner panel 11 is basically deformed into a hat cross-sectional shape or the like, and the skeleton structure is basically provided only on the inner panel 11.

In the rear gate 10, it is difficult to form a skeleton structure for deforming the panel into a hat cross-sectional shape or the like on both the inner panel 11 and the outer panel 12.

There is a possibility that the rear gate 10 gives an impression of insufficient rigidity to an occupant or the like who opens and closes the rear gate 10.

For example, when closing the open rear gate 10, the occupant pulls down the lower edge central portion of the open rear gate 10 by hand, as indicated by a force Fa in FIGS. 3 and 4. In the rear gate 10, a glass opening is formed in the upper portion of the inner panel 11 and the upper portion of the outer panel 12 in order to provide the rear glass 13.

The input of the lower edge central portion of the rear gate 10 may cause the rear gate 10 to flex in such a manner that its lower portion bends relative to its upper portion.

In addition, in the upper portion of the rear gate 10, when the skeleton part is formed only in the inner panel 11 vertically on both left and right sides of the glass opening, the upper portion of the rear gate 10 itself can be bent and bent by the input of the lower edge central portion of the rear gate 10.

Other than this, for example, when closing the open rear gate 10, the occupant may pull down a lower edge left end portion or a lower edge right end portion like a force Fb or a force Fc of FIG. 3 instead of a lower edge central portion of the rear gate 10 like the force Fa of FIGS. 3 and 4. The left and right portions of the lower portion of the rear gate 10 may flex so as to be twisted relative to, for example, a central portion of the lower portion of the rear gate 10.

In addition, due to an input of a rotational force around upper and lower axes at the center in the vehicle width direction with respect to the rear gate 10, an undesirable force in a direction different from a movable direction may act on the left cylinder member 16 and the right cylinder member 16 coupling the left and right edges of the rear gate 10 and the vehicle body 2. Similarly, an undesirable force in a direction different from the movable direction may also act on the left hinge member 6 and the right hinge member 7 that support the upper edge of the rear gate 10 so as to be openable and closable to the vehicle body 2.

Other than this, for example, there is a possibility that a force in the vehicle width direction of the automobile 1, such as a force Fd in FIG. 3, is input from a side to the open rear gate 10. Such a lateral input Fd may generate a force Fr that rotates the rear gate 10 in the plane of the rear gate 10. As a result, the rear gate 10 may flex in such a manner that its entirety deforms from a quadrangle to a parallelogram.

In addition, when the force Fr for rotating the rear gate 10 in the plane is input, an undesirable force in a direction different from the movable direction thereof may act on the left cylinder member 16 and the right cylinder member 16 couple the left and right edges of the rear gate 10 and the vehicle body 2. Similarly, an undesirable force in a direction different from the movable direction of the left hinge member 6 and the right hinge member 7 that support the upper edge of the rear gate 10 to the vehicle body 2 so as to be openable and closable may act on the left hinge member 6 and the right hinge member 7.

As described above, the rear gate 10 of the automobile 1 is required to increase rigidity so that the rear gate 10 does not flex or is not bent while ensuring the design of the rear gate 10.

Figure 5:
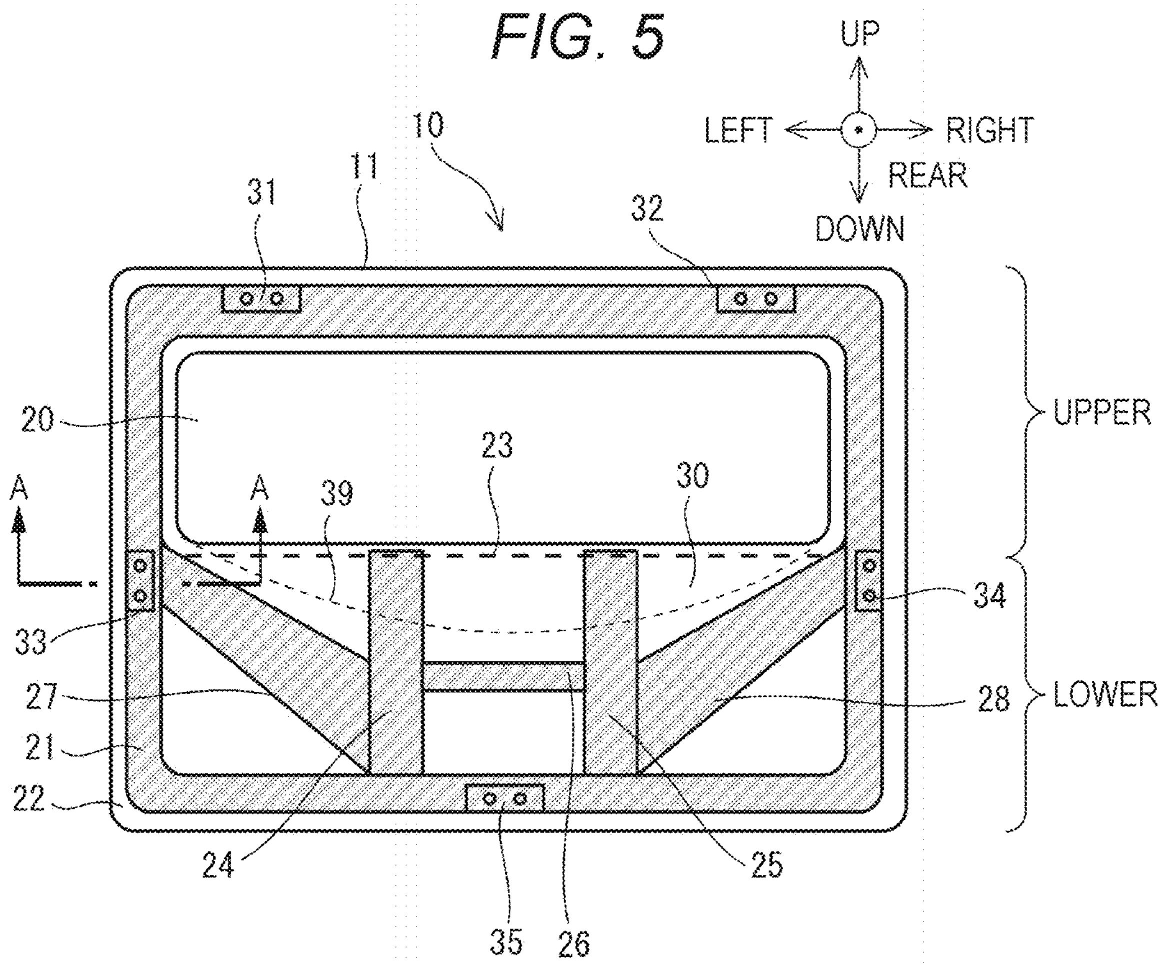
FIG. 5 is a schematic explanatory view of an inner panel of the rear gate of FIG. 1 as viewed from behind.

FIG. 5 is a schematic explanatory view of the inner panel 11 of the rear gate 10 of FIG. 1 as viewed from the rear.

A glass opening 20 in which the rear glass 13 overlaps is formed in an upper portion of the inner panel 11 of the present embodiment. Further, in the inner panel 11, an auxiliary panel 30 joined to the inner panel 11 is provided below the glass opening 20.

A window peripheral edge 23 that is a peripheral edge portion around the glass opening 20 is joined to a window peripheral edge that is a peripheral edge portion around the glass opening of the outer panel 12.

Then, in the inner panel 11, an outer peripheral skeleton part 21, a left longitudinal inner skeleton part 24, a right longitudinal inner skeleton part 25, a central connecting skeleton part 26, a left oblique inner skeleton part 27, and a right oblique inner skeleton part 28 are formed as skeleton parts. The skeleton parts are formed in the inner panel 11 by extruding a steel plate for the inner panel 11 by press working to be deformed into a hat cross-sectional shape.

The outer peripheral skeleton part 21 is formed in the inner panel 11 along the outer peripheral edge of the substantially rectangular inner panel 11. The outer peripheral skeleton part 21 is formed in an annular shape along the outer peripheral edge of the substantially rectangular inner panel 11.

Then, a left cylinder attachment part 33, a right cylinder attachment part 34, a striker attachment part 35, a left hinge attachment part 31, and a right hinge attachment part 32 are disposed in the outer peripheral skeleton part 21.

The left cylinder attachment part 33 is a portion for attaching the left cylinder member 16 to a center of a left edge of the inner panel 11 of the rear gate 10 by screwing.

The right cylinder attachment part 34 is a portion for attaching the right cylinder member 16 to a center of a right edge of the inner panel 11 of the rear gate 10 by screwing.

The striker attachment part 35 is a portion for attaching the striker member 17 to the center of the lower edge of the inner panel 11 of the rear gate 10 by screwing.

The left hinge attachment part 31 is a portion for mounting the left hinge member 6 to a left side of an upper edge of the inner panel 11 of the rear gate 10 by screwing.

The right hinge attachment part 32 is a portion for mounting the right hinge member 7 to a right side of the upper edge of the inner panel 11 of the rear gate 10 by screwing.

The left longitudinal inner skeleton part 24 is formed at a lower portion of the inner panel 11 inside the outer peripheral skeleton part 21. The left longitudinal inner skeleton part 24 is formed vertically along the up-down direction in a left side portion of the lower portion of the inner panel 11. An upper end of the left longitudinal inner skeleton part 24 is connected to the window peripheral edge 23. A lower end of the left longitudinal inner skeleton part 24 is connected to the outer peripheral skeleton part 21.

The right longitudinal inner skeleton part 25 is formed at the lower portion of the inner panel 11 inside the outer peripheral skeleton part 21. The right longitudinal inner skeleton part 25 is formed vertically along the up-down direction in the right side portion of the lower portion of the inner panel 11. An upper end of the right longitudinal inner skeleton part 25 is connected to the window peripheral edge 23. The lower end of the right longitudinal inner skeleton part 25 is connected to the outer peripheral skeleton part 21.

The central connecting skeleton part 26 is formed at the lower portion of the inner panel 11 inside the outer peripheral skeleton part 21. The central connecting skeleton part 26 is formed laterally along the left-right direction in the lower portion of the inner panel 11. The left end of the central connecting skeleton part 26 is connected to the left longitudinal inner skeleton part 24. The right end of the central connecting skeleton part 26 is connected to the right longitudinal inner skeleton part 25.

The left oblique inner skeleton part 27 is formed at the lower portion of the inner panel 11 inside the outer peripheral skeleton part 21. The left oblique inner skeleton part 27 is formed obliquely so as to extend from a left side of a lower end of the left longitudinal inner skeleton part 24 toward an upper left direction in the lower portion of the inner panel 11. A lower end of the left oblique inner skeleton part 27 is connected to the left longitudinal inner skeleton part 24. The upper end of the left longitudinal inner skeleton part 24 is joined to the left edge center of the outer peripheral skeleton part 21.

The right oblique inner skeleton part 28 is formed at the lower portion of the inner panel 11 inside the outer peripheral skeleton part 21. The right oblique inner skeleton part 28 is formed obliquely so as to extend from a right side of a lower end of the right longitudinal inner skeleton part 25 toward an upper right direction in the lower portion of the inner panel 11. A lower end of the right oblique inner skeleton part 28 is connected to the right longitudinal inner skeleton part 25. The upper end of the right longitudinal inner skeleton part 25 is joined to a center of a right edge of the outer peripheral skeleton part 21.

Figure 6:
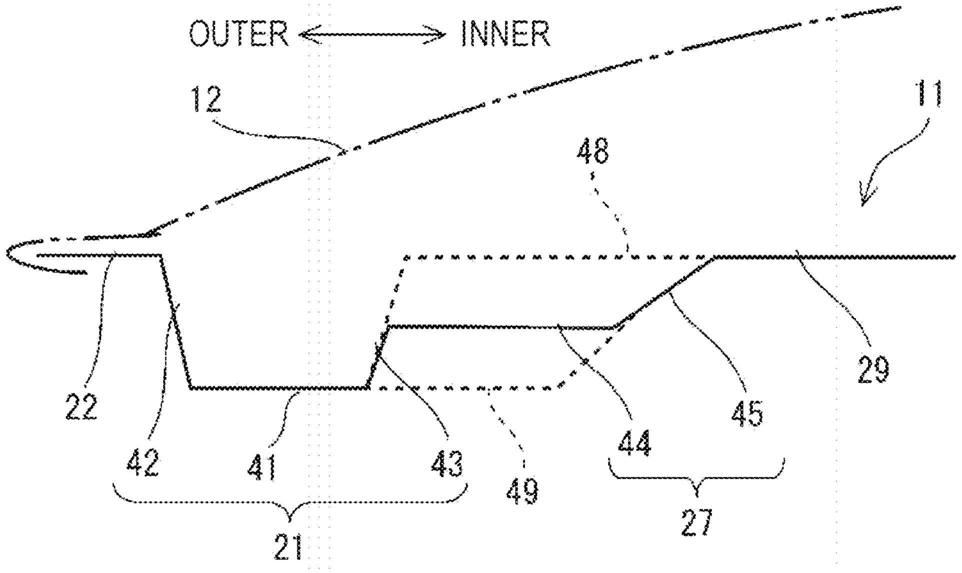
FIG. 6 is an A-A horizontal cross-sectional view of a left edge central portion of the inner panel of FIG. 5.

FIG. 6 is an A-A transverse cross-sectional view of a left edge central portion of the inner panel 11 of FIG. 5. FIG. 6 also illustrates the outer panel 12 of the rear gate 10.

Note that a right edge central portion of the inner panel 11 also has a cross section similar to that in FIG. 6, as illustrated in FIG. 6 reversed.

In FIG. 6, Inner is the right side, and Outer is the left side.

As illustrated in FIG. 6, the outer peripheral skeleton part 21 having the hat cross-sectional shape has an outer inclined surface 42, a bottom surface portion 41, and an inner inclined surface 43. Thus, a hat cross-sectional shape that can serve as a skeleton structure is obtained.

An outer peripheral edge 22 of the inner panel 11 is formed outside the outer inclined surface 42 of the outer peripheral skeleton part 21.

A bottom surface portion 44 of the left oblique inner skeleton part 27 is formed inside the inner inclined surface 43 of the outer peripheral skeleton part 21. In the A-A cross section, the left oblique inner skeleton part 27 has a bottom surface portion 44 and an inner inclined surface 45.

On the inside of the inner inclined surface 45 of the left oblique inner skeleton part 27, an inner portion 29 of the inner panel 11, which is disposed inward from the left oblique inner skeleton part 27, is formed. In the example of FIG. 6, the inner portion 29 of the inner panel 11 has a non-bent planar surface shape by the inner panel 11 and the auxiliary panel 30.

As described above, in the present embodiment, various types of skeleton parts such as the left oblique inner skeleton part 27 are connected to the outer peripheral skeleton part 21 with a step inside the outer peripheral skeleton part 21.

Note that, in a portion different from the A-A cross section of FIG. 6, the inner skeleton part is not connected to the inside of the outer peripheral skeleton part 21. The cross section in this case is as indicated by a broken line 48 in FIG. 6. The outer inclined surface 42 and the inner inclined surface 43 of the outer peripheral skeleton part 21 have a hat cross-sectional shape opposite to the bottom surface portion 41.

On the other hand, unlike the present embodiment, it is also conceivable to align the bottom surface portion 41 of the left oblique inner skeleton part 27 flush with the bottom surface portion 41 of the outer peripheral skeleton part 21 as indicated by reference numeral 49 in FIG. 6. However, when the two bottom surface portions 41 are aligned flush with each other as described above, a wide bottom surface is formed by the bottom surface portions 41. The outer peripheral skeleton part 21 does not have the inner inclined surface 43 at the connecting portion where the wide bottom surface is formed. As a result, the rigidity of the portion of the inner panel 11 where the outer peripheral skeleton part 21 and the inner skeleton part are connected is less likely to increase even though the outer peripheral skeleton part 21 and the inner skeleton part are formed in the inner panel 11. The inner panel 11 has lower rigidity at a connecting portion between the outer peripheral skeleton part 21 and the inner skeleton part than at other portions where such connection is not made.

In the present embodiment, various types of skeleton parts such as the left oblique inner skeleton part 27 are connected to the outer peripheral skeleton part 21 with a step. Thus, in the present embodiment, also in the connecting portion, the cross-sectional shape of each skeleton part is left as much as possible to suppress the decrease in rigidity in the connecting portion. In the present embodiment, for example, rigidity that can be expected by forming the outer peripheral skeleton part 21 along the outer periphery of the inner panel 11 can be easily ensured.

Figure 7:
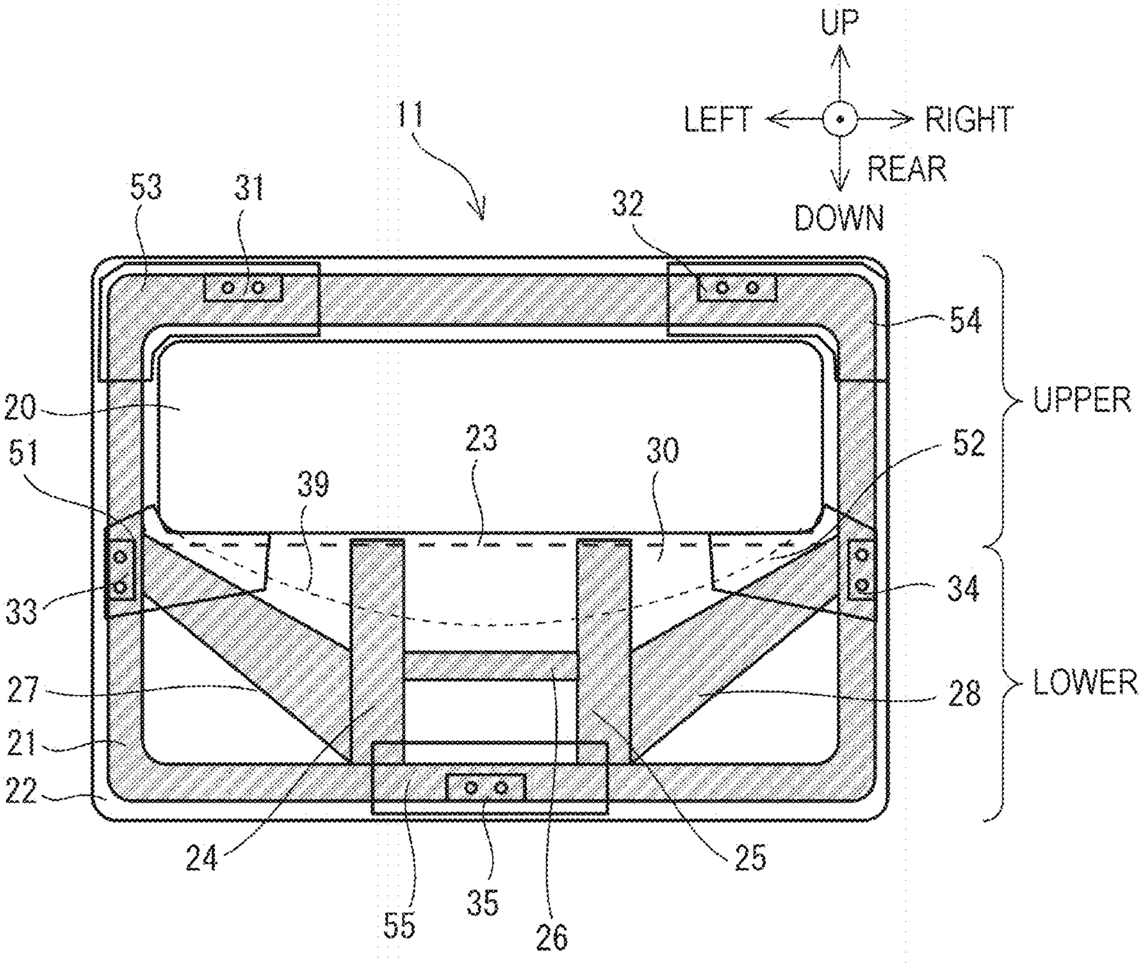
FIG. 7 is an explanatory view of stiffening plates provided for the inner panel of FIG. 5 in the embodiment.

FIG. 7 is an explanatory view of stiffening plates provided for the inner panel 11 of FIG. 5 in the present embodiment.

In the present embodiment, stiffening plates are provided for the inner panel 11 in order to stiffen the inner panel 11 to ensure desired rigidity as the rear gate 10.

FIG. 7 illustrates a left stiffening plate 51, a right stiffening plate 52, a lower stiffening plate 55, an upper left stiffening plate 53, and an upper right stiffening plate 54 as stiffening plates.

In this structure, the left stiffening plate 51, the right stiffening plate 52, and the lower stiffening plate 55 are overlapped on the connecting portion between the outer peripheral skeleton part 21 and the inner skeleton part.

The upper left stiffening plate 53 and the upper right stiffening plate 54 overlap the outer peripheral skeleton part 21.

The stiffening plates are joined to the inner panel 11 by spot welding or the like. The stiffening plates are sandwiched between the inner panel 11 and the outer panel 12 of the rear gate 10.

The left stiffening plate 51 is provided so as to overlap the connecting portion between the outer peripheral skeleton part 21 and an upper end portion of the left oblique inner skeleton part 27. Further, the left stiffening plate 51 overlaps the left cylinder attachment part 33 provided on the outer inclined surface 42 of the outer peripheral skeleton part 21. The left stiffening plate 51 is formed in a horizontally long substantially rectangular outer shape and size overlapping a range from the outer inclined surface 42 of the outer peripheral skeleton part 21 to the window peripheral edge 23 with respect to the inner panel 11.

The right stiffening plate 52 is provided so as to overlap the connecting portion between the outer peripheral skeleton part 21 and an upper end portion of the right oblique inner skeleton part 28. Further, the right stiffening plate 52 overlaps the right cylinder attachment part 34 provided on the outer inclined surface 42 of the outer peripheral skeleton part 21. The right stiffening plate 52 is formed in a horizontally long substantially rectangular outer shape and size overlapping a range from the outer inclined surface 42 of the outer peripheral skeleton part 21 to the window peripheral edge 23 with respect to the inner panel 11.

The lower stiffening plate 55 is provided so as to overlap a connecting portion between the outer peripheral skeleton part 21 and a lower end portion of the left longitudinal inner skeleton part 24 and a connecting portion between the outer peripheral skeleton part 21 and the right longitudinal inner skeleton part 25. Further, the lower stiffening plate 55 overlaps the striker attachment part 35 provided on the outer inclined surface 42 of the outer peripheral skeleton part 21. The lower stiffening plate 55 is formed in a horizontally long substantially rectangular outer shape and size overlapping a range from the lower end portion of the left longitudinal inner skeleton part 24 to the lower end portion of the right longitudinal inner skeleton part 25.

The upper left stiffening plate 53 is provided so as to overlap an upper left corner portion of the outer peripheral skeleton part 21 annularly formed along an outer edge of the inner panel 11. The upper left stiffening plate 53 has a curved long plate shape having an outer shape curved in a substantially L shape along the upper left corner portion of the outer peripheral skeleton part 21. A right edge portion of the upper left stiffening plate 53 having the curved long plate shape is closer to the center in the vehicle width direction than the left hinge attachment part 31. A curved distal left lower edge portion of the upper left stiffening plate 53 having the curved long plate shape is located to the left of the glass opening 20. The upper left stiffening plate 53 overlaps the left hinge attachment part 31 provided on the outer inclined surface 42 of the outer peripheral skeleton part 21.

The upper right stiffening plate 54 is provided so as to overlap an upper right corner portion of the outer peripheral skeleton part 21 formed annularly along the outer edge of the inner panel 11. The upper right stiffening plate 54 has a curved long plate shape having an outer shape curved in a substantially L shape along the upper right corner portion of the outer peripheral skeleton part 21. The left edge portion of the upper right stiffening plate 54 having the curved long plate shape is closer to the center in the vehicle width direction than the right hinge attachment part 32. A curved distal right lower edge portion of the upper right stiffening plate 54 having the curved long plate shape is located to the right of the glass opening 20. The upper right stiffening plate 54 overlaps the right hinge attachment part 32 provided on the outer inclined surface 42 of the outer peripheral skeleton part 21.

Figure 8:
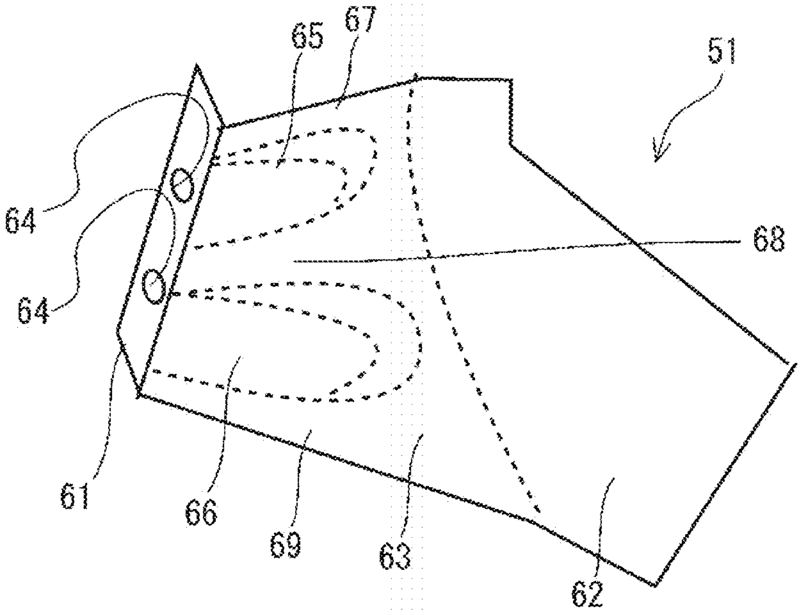
FIG. 8 is a schematic perspective view of a left stiffening plate in FIG. 7.

FIG. 8 is a schematic perspective view of the left stiffening plate 51 in FIG. 7.

The left stiffening plate 51 of FIG. 8 includes an outer junction 61, an inner junction 62, and a connecting stiffening plate portion 63 between the outer junction 61 and the inner junction 62. The left stiffening plate 51 may be formed to include respective portions illustrated in FIG. 8 by, for example, extruding a steel plate having the outer shape in FIG. 8 by press working.

As in FIG. 8, the right stiffening plate 52 also includes an outer junction 61, an inner junction 62, and a connecting stiffening plate portion 63. However, the order of right and left is changed from that in FIG. 8. In addition, the other stiffening plates illustrated in FIG. 7 may also basically include an outer junction 61, an inner junction 62, and a connecting stiffening plate portion 63.

The outer junction 61 is formed in an elongated plate shape along the outer inclined surface 42 of the outer peripheral skeleton part 21. The outer junction 61 stands relative to the connecting stiffening plate portion 63. In the outer junction 61, a pair of screw holes 64 for screwing together with the left cylinder attachment part 33 of the inner panel 11 and the left cylinder member 16 is formed in a portion overlapping with the left cylinder attachment part 33.

The inner junction 62 is formed in a planar shape following a portion of the inner panel 11 inward from the left oblique inner skeleton part 27. Here, for example, a planar example is illustrated.

The inner junction 62 is formed in a relatively large surface to allow the left stiffening plate 51 to reach the window peripheral edge 23. Note that the left stiffening plate 51 may be formed on a surface that does not reach the window peripheral edge 23 but reaches, for example, a junction portion between the auxiliary panel 30 and the inner panel 11.

The connecting stiffening plate portion 63 is a portion having a basically flat plate shape between the outer junction 61 and the inner junction 62. The outer junction 61 is bent largely so as to be bent at a substantially right angle with respect to the connecting stiffening plate portion 63 having a basically flat plate shape. The inner junction 62 is slightly bent with respect to the connecting stiffening plate portion 63 having a basically flat plate shape.

In the connecting stiffening plate portion 63 having a basically flat plate shape, an upper recess 65 and a lower recess 66 are formed side by side vertically. Thus, in the connecting stiffening plate portion 63, an upper edge connecting surface portion 67, the upper recess 65, a connecting bone portion 68, the lower recess 66, and a lower edge connecting surface portion 69 are formed side by side from the top to the bottom. With such a three-dimensional structure, the connecting stiffening plate portion 63 is less likely to be bent or twisted.

The upper edge connecting surface portion 67, the connecting bone portion 68, and the lower edge connecting surface portion 69 are portions having a basically flat plate shape.

Figure 9:
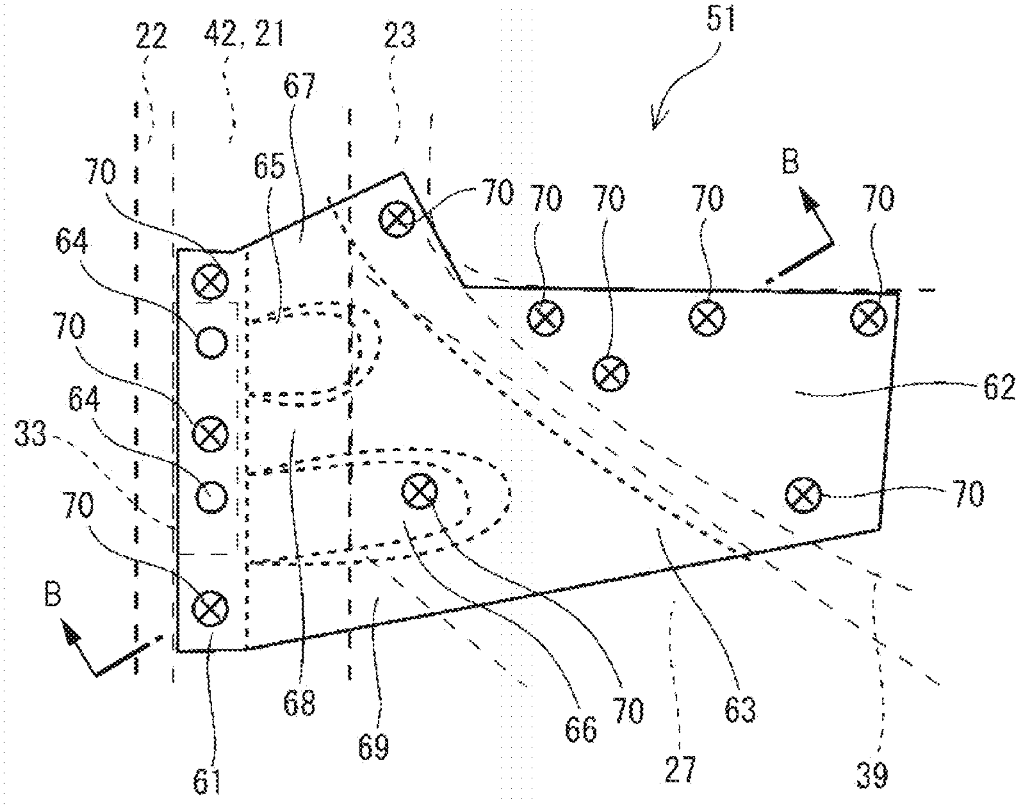
FIG. 9 is an explanatory view of a joint state between the left stiffening plate in FIG. 8 and the inner panel.

FIG. 9 is an explanatory view of a joint state between the left stiffening plate 51 in FIG. 8 and the inner panel 11.

The left stiffening plate 51 is provided so as to overlap the connecting portion between the outer peripheral skeleton part 21 of the inner panel 11 and the upper end portion of the left oblique inner skeleton part 27.

The outer junction 61 of the left stiffening plate 51 is provided along the outer inclined surface 42 of the outer peripheral skeleton part 21. The outer junction 61 overlaps the left cylinder attachment part 33. The inner junction 62 overlaps a lower left corner portion of the window peripheral edge 23.

The right stiffening plate 52 is also provided so as to overlap the connecting portion between the outer peripheral skeleton part 21 of the inner panel 11 and the upper end portion of the right oblique inner skeleton part 28 in a state as in FIG. 9.

In the overlapping state of FIG. 9, the left stiffening plate 51 and the inner panel 11 are joined by spot welding or the like.

FIG. 9 illustrates an example of junctions 70 between the left stiffening plate 51 and the inner panel 11.

In FIG. 9, the outer junction 61 is joined to the outer inclined surface 42 that is an outer portion of the outer peripheral skeleton part 21 at three junctions 70 above, below, and between the pair of screw holes 64.

The inner junction 62 is joined to the lower left corner portion of the window peripheral edge 23 at the junctions 70. Further, the inner junction 62 is joined to the junction portion between the auxiliary panel 30 and the inner panel 11 at the junctions 70. Thus, the inner junction 62 is joined to the portion of the inner panel 11 disposed inward from the left oblique inner skeleton part 27 by the junctions 70.

The connecting stiffening plate portion 63 is joined to the bottom surface portion 44 of the left oblique inner skeleton part 27 in the lower recess 66. Note that the upper recess 65 may also be joined to the bottom surface portion 41 of the outer peripheral skeleton part 21 or the bottom surface portion 44 of the left oblique inner skeleton part 27.

With the junctions 70 as illustrated in FIG. 9, the outer junction 61 is joined to the outer inclined surface 42 that is an outer portion of the outer peripheral skeleton part 21 of the inner panel 11 in a portion on an extension of the upper edge connecting surface portion 67, a portion on an extension of the connecting bone portion 68, and a portion on an extension of the lower edge connecting surface portion 69 of the connecting stiffening plate portion 63.

The inner junction 62 is joined to a portion 29 of the inner panel 11 disposed inward from the left oblique inner skeleton part 27 at the portion on the extension of the upper edge connecting surface portion 67, the portion on the extension of the connecting bone portion 68, and the portion on the extension of the lower edge connecting surface portion 69 of the connecting stiffening plate portion 63.

Thus, the upper edge connecting surface portion 67 having a basically flat plate shape can linearly connect the junction 70 on the inside and the junction on the outer side at a shortest possible distance. The upper edge connecting surface portion 67 increases the rigidity between the inner junction 70 and the outer junction.

The lower edge connecting surface portion 69 having a basically flat plate shape can linearly connect the junction 70 on the inner side and the junction on the outer side at a shortest possible distance. The lower edge connecting surface portion 69 increases the rigidity between the inner junction 70 and the outer junction.

The connecting bone portion 68 having a basically flat plate shape can linearly connect the inner junction 70 on the inside and the junction on the outer side at a shortest possible distance. The connecting bone portion 68 increases rigidity between the inner junction 70 and the outer junction.

Figure 10:
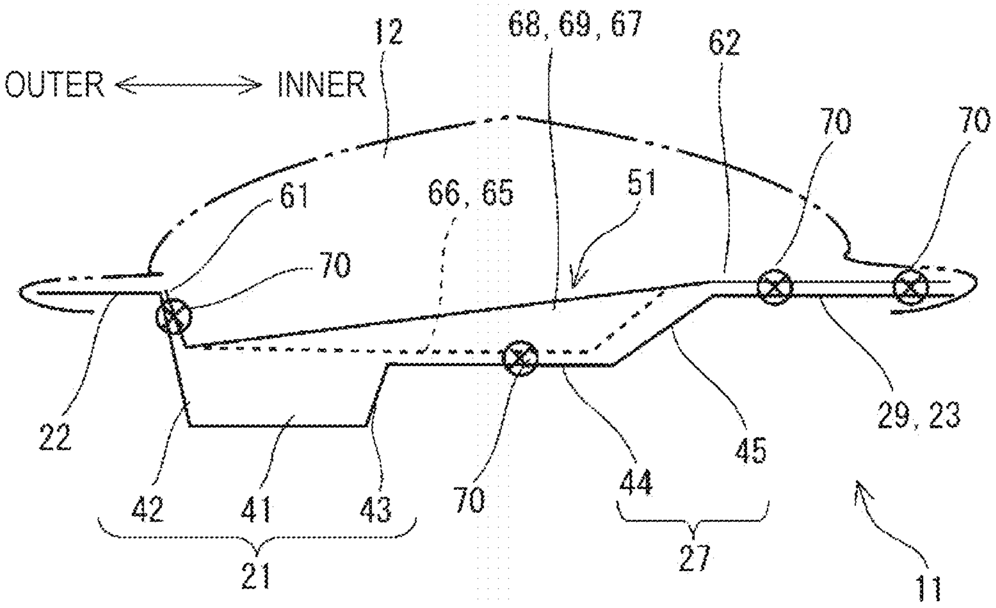
FIG. 10 is a cross-sectional view taken along line B-B of the left stiffening plate and the inner panel in FIG. 9.

FIG. 10 is a cross-sectional view taken along line B-B of the left stiffening plate 51 and the inner panel 11 in FIG. 9.

The outer peripheral skeleton part 21 and the left oblique inner skeleton part 27 also appear in a cross-sectional shape similar to the A-A cross-sectional view of FIG. 6 in the B-B cross section of FIG. 10. FIG. 10 also illustrates the outer panel 12 of the rear gate 10.

Then, as indicated by a broken line in FIG. 10, the connecting stiffening plate portion 63, which is a portion of the left stiffening plate 51 overlapping the outer peripheral skeleton part 21 and the left oblique inner skeleton part 27, is joined to the bottom surface portion 44 of the left oblique inner skeleton part 27 in the lower recess 66.

The outer junction 61 is joined to the outer inclined surface 42 of the outer peripheral skeleton part 21. The inner junction 62 is joined to a portion of the inner panel 11 disposed inward from the left oblique inner skeleton part 27. The portion inward from the left oblique inner skeleton part 27 includes the window peripheral edge 23 where high rigidity is obtained and the junction portion between the auxiliary panel 30 and the inner panel 11.

In addition, one junction 70 of the outer junction 61, one junction 70 of the connecting stiffening plate portion 63, and two junctions 70 of the inner junction 62 are arranged in a straight line in a B-B cross-sectional line illustrated in FIG. 9.

With such a combination of the junctions 70, the upper edge connecting surface portion 67, the lower edge connecting surface portion 69, and the connecting bone portion 68 firmly couple the outer junction 61 and the inner junction 62, and can suppress deformation in which the distance between the outer junction 61 and the inner junction 62 changes.

Further, the left oblique inner skeleton part 27 is coupled to the outer inclined surface 42 of the outer peripheral skeleton part 21 through the left stiffening plate 51 which is hardly deformed.

As described above, according to the present embodiment, since the stiffening plates such as the left stiffening plate 51 and the right stiffening plate 52 are joined to the inner panel 11, the rigidity of the rear gate 10 can be increased by the inner panel 11 and the stiffening plates. Moreover, since the rigidity of the rear gate 10 is increased by the inner panel 11 and the stiffening plate, the outer panel 12 can be formed so as to ensure the design of the rear gate 10.

Furthermore, in the present embodiment, the outer peripheral skeleton part 21 is formed in the inner panel 11 along the outer peripheral edge of the inner panel 11, and an internal skeleton part such as the left oblique inner skeleton part 27 is further formed inside the outer peripheral skeleton part 21. At this time, both ends of the inner skeleton part are coupled to the outer peripheral skeleton part 21 with a step. The basic shape of the outer peripheral skeleton part 21 can be left at a portion to which the inner skeleton part of the outer peripheral skeleton part 21 is coupled with a step. On the other hand, for example, when both ends of the inner skeleton part are coupled to the outer peripheral skeleton part 21 without a step, a large planar portion due to the inner skeleton part and the outer peripheral skeleton part 21 is formed at the connecting portion. As a result, it is difficult for the inner panel 11 to obtain rigidity due to the skeleton structure in the large plane portion. By providing the skeleton parts in the inner panel 11, the rigidity of the inner panel 11 itself is partially reduced. In the present embodiment, it is possible to suppress such a decrease in rigidity at the connecting portion and to enhance the rigidity of the inner panel 11 itself by the skeleton parts.

In the present embodiment, a stiffening plate such as the left stiffening plate 51 and the right stiffening plate 52 is overlapped on such a connecting portion and joined to the inner panel 11. For example, the stiffening plate includes the outer junction 61, the inner junction 62, and the connecting stiffening plate portion 63 between the outer junction 61 and the inner junction 62. The outer junction 61 of the stiffening plate overlaps the outer inclined surface 42 that is the outer portion of the outer peripheral skeleton part 21, and is joined to the inner panel 11 at the outer portion of the outer peripheral skeleton part 21. The inner junction 62 is joined to a portion of the inner panel 11 inward from the inner skeleton part. The connecting stiffening plate portion 63 is joined to the inner panel 11 at the inner skeleton part. As described above, in the connecting portion of the skeleton parts of the inner panel 11, the stiffening plate is joined at at least three positions of each of the skeleton parts and the inner portion of each of the skeleton parts, so that the connecting portion is less likely to flex or bend.

Moreover, the outer junction 61 of the stiffening plates, such as the left stiffening plate 51 and the right stiffening plate 52, are joined at the outer portion of the outer peripheral skeleton part 21. The outer peripheral skeleton part 21 is formed along the outer peripheral edge of the inner panel 11. In the rear gate 10, the outer peripheral edge of the inner panel 11 is basically joined to the outer peripheral edge of the outer panel 12 over the entire circumference. In the rear gate 10, the outer peripheral edge of the inner panel 11 has high rigidity. Since the stiffening plate is joined to the outer portion of the outer peripheral skeleton part 21 close to the highly rigid outer peripheral edge, the junction portion is less likely to fluctuate even if an external force acts on the rear gate 10 and the inner panel 11. The attachment state of the stiffening plate to the inner panel 11 hardly fluctuates. It is difficult for a force for peeling off the joint to act on joints between the stiffening plate and the inner panel 11.

In the present embodiment, in the inner panel 11, an attachment part of a coupling member for supporting the rear gate 10 on the automobile 1, for example, the left cylinder attachment part 33 is formed on the outer inclined surface 42 that is the outer portion of the outer peripheral skeleton part 21. The outer junction 61 of the stiffening plates, such as the left stiffening plate 51 and the right stiffening plate 52, overlaps the attachment part and is screwed together with the mounting member. Thus, for example, a force acting on the stiffening plate through the inner skeleton part can be transmitted directly from the stiffening plate to the coupling member, for example the left cylinder member 16, for supporting the rear gate 10 on the automobile 1. In the inner panel 11, since the outer peripheral skeleton part 21 is provided around the inner skeleton part, the inner skeleton part cannot be formed up to the attachment part of the coupling member or the vicinity thereof, but a force acting on the inner skeleton part can be directly transmitted to the coupling member through the stiffening plate.

In the present embodiment, in the connecting stiffening plate portion 63 of the stiffening plates such as the left stiffening plate 51 and the right stiffening plate 52, the upper recess 65 and the lower recess 66 are formed side by side vertically. Thus, in the connecting stiffening plate portion 63, the upper edge connecting surface portion 67, the upper recess 65, the connecting bone portion 68, the lower recess 66, and the lower edge connecting surface portion 69 are formed side by side from the top to the bottom. The connecting stiffening plate portion 63 having such a three-dimensional structure is hardly bent or twisted. The stiffening plate is less likely to deform, and the force acting on the stiffening plate can be transmitted as it is.

Moreover, by forming the upper recess 65 and the lower recess 66 in this manner, the connecting stiffening plate portion 63 can be joined to the oblique inner skeleton part of the inner panel 11 in at least one of the upper recess 65 or the lower recess 66.

In addition, the stiffening plates such as the left stiffening plate 51 and the right stiffening plate 52 including the connecting stiffening plate portion 63 having a three-dimensional structure are joined to the inner panel 11 at least at the above-described three portions. The cross section formed by the stiffening plate including the connecting stiffening plate portion 63 having a three-dimensional structure and the inner panel 11 is hardly deformed. The connecting portion between the outer peripheral skeleton part 21 and the inner skeleton part of the inner panel 11 is hardly deformed.

In the present embodiment, the outer junction 61 of the stiffening plates such as the left stiffening plate 51 and the right stiffening plate 52 is joined to the outer portion of the outer peripheral skeleton part 21 of the inner panel 11 in the portion on the extension of the upper edge connecting surface portion 67, the portion on the extension of the connecting bone portion 68, and the portion on the extension of the lower edge connecting surface portion 69 of the connecting stiffening plate portion 63. In addition, the inner junction 62 of the stiffening plate is joined to a portion of the inner panel 11 inward from the oblique inner skeleton part in the portion on the extension of the upper edge connecting surface portion 67, the portion on the extension of the connecting bone portion 68, and the portion on the extension of the lower edge connecting surface portion 69 of the connecting stiffening plate portion 63.

Thus, the upper edge connecting surface portion 67 and the lower edge connecting surface portion 69 are provided between the outer peripheral skeleton part 21 of the inner panel 11 and the portion inward from the oblique inner skeleton part so as to be bridged therebetween.

Moreover, the connecting bone portion 68 extends between the upper edge connecting surface portion 67 and the lower edge connecting surface portion 69. Thus, the connecting stiffening plate portions 63 of the stiffening plates such as the left stiffening plate 51 and the right stiffening plate 52 easily maintain their shapes even when an external force acts. Since the upper edge connecting surface portion 67 and the lower edge connecting surface portion 69 of the stiffening plate capable of maintaining the shape against the external force are bridged, it is easy to maintain the interval and the relative position between the outer peripheral skeleton part 21 of the inner panel 11 and the portion inward from oblique inner skeleton part with respect to the external force.

In the present embodiment, the inner junction 62 of the stiffening plates such as the left stiffening plate 51 and the right stiffening plate 52 overlaps the peripheral edge portion around the glass opening 20, and is joined to the inner panel 11 at the peripheral edge portion. Further, the inner junction 62 further overlaps the junction portion between the inner panel 11 and the auxiliary panel 30, and is joined to the inner panel 11 at the junction portion. Thus, the inner junction 62 can be firmly joined to the portion of the inner panel 11 inward from the oblique inner skeleton part. In addition, even if the portion of the inner panel 11 inside the oblique inner skeleton part has a planar shape without a skeleton part, the inner junction 62 can be firmly joined and supported to the portion of the inner panel 11 inward from the oblique inner skeleton part by being joined at two positions with respect to the plane.

As described above, in the present embodiment, the rigidity of the rear gate 10 can be enhanced while ensuring the design of the rear gate 10.

For example, when the rear gate 10 is opened and closed, the force Fa in FIG. 4 or the like is input to the lower edge central portion of the rear gate 10.

A part of this force Fa can be transmitted to the window peripheral edge 23, which is a peripheral edge portion around the glass opening 20, through the left longitudinal inner skeleton part 24 and the right longitudinal inner skeleton part 25, for example. Since the window peripheral edge 23 has a strong structure in which the inner panel 11 and the outer panel 12 are overlapped and joined, force can be further transmitted in the left-right direction to the left stiffening plate 51, the right stiffening plate 52, and the like.

In addition, another part of the force Fa can be transmitted to the left stiffening plate 51, the right stiffening plate 52, and the like through the left oblique inner skeleton part 27 and the right oblique inner skeleton part 28 arranged in a substantially V shape. The left stiffening plate 51 is screwed to the left cylinder member 16. The right stiffening plate 52 is screwed to the right cylinder member 16.

As a result, in the present embodiment, the rear gate 10 formed by overlapping the inner panel 11 and the outer panel 12 is less likely to flex or bend by the input of the force Fa.

For example, the lower portion of the rear gate 10 is hardly caused to flex in such a manner as to bend relative to the upper portion of the rear gate 10. The upper portion of the rear gate 10 itself is less likely to bend or flex.

Other than this, for example, when the rear gate 10 is opened and closed, the occupant may input the force Fb and the force Fc of FIG. 3.

For example, a lower left portion of the rear gate 10 can be bent relative to other portions by the force Fb. However, in the present embodiment, the outer peripheral skeleton part 21 is joined to the left stiffening plate 51, and is further indirectly joined to the left oblique inner skeleton part 27 and the window peripheral edge 23 through the left stiffening plate 51. In addition, a rectangular frame-shaped skeleton structure is formed by the left longitudinal inner skeleton part 24, the window peripheral edge 23, and the outer peripheral skeleton part 21. In the rectangular frame-shaped skeleton structure, the left oblique inner skeleton part 27 is provided in a diagonal manner so as to be hardly deformed.

As a result, the outer peripheral skeleton part 21 of the lower left portion of the rear gate 10 in the present embodiment is less likely to be deformed or flexed or bent by the input of the force Fb.

Other than this, for example, the glass opening 20 is formed in the upper portion of the inner panel 11 in order to provide the rear glass 13. Thus, only the outer peripheral skeleton part 21 is formed as a skeleton structure in the upper portion of the inner panel 11. In this case, the outer peripheral skeleton part 21 is easily bent at a connection portion between an upper portion and a lower portion thereof. In the present embodiment, the left stiffening plate 51 and the right stiffening plate 52 are joined to the connecting portion between the upper portion and the lower portion of the outer peripheral skeleton part 21 in an overlapping manner.

As a result, the outer peripheral skeleton part 21 is hardly bent at the connection portion between the upper portion and the lower portion.

The above embodiments are examples of preferred embodiments of the disclosure, but the disclosure is not limited thereto, and various modifications or changes can be made without departing from the gist of the disclosure.

Figure 11:
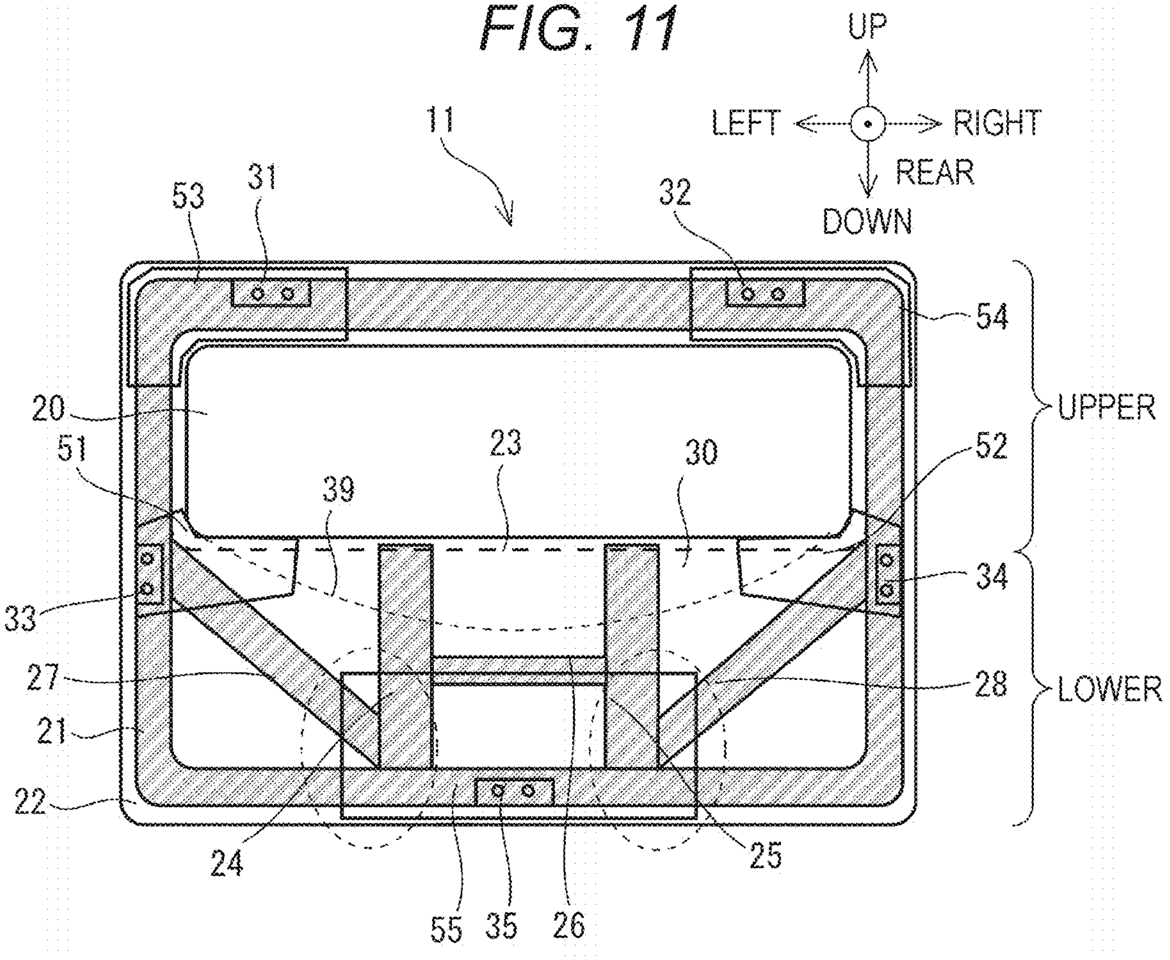
FIG. 11 is a schematic explanatory view of a modification of the stiffening plates in FIG. 7 as viewed from behind.

FIG. 11 is a schematic explanatory view of a modification of the stiffening plates in FIG. 7 as viewed from behind. In FIG. 11, the lower stiffening plate 55 of the stiffening plates is modified from that of FIG. 7.

The lower stiffening plate 55 of FIG. 11 is formed in a horizontally long substantially rectangular outer shape and size overlapping a lower end portion of the left oblique inner skeleton part 27, a lower end portion of the right oblique inner skeleton part 28, and the outer peripheral skeleton part 21. The lower stiffening plate 55 is screwed to the striker member 17 together with the striker attachment part 35.

In such a lower stiffening plate 55, as indicated by a broken line frame in the drawing, a left side portion of the lower stiffening plate 55 overlaps a connecting portion of the outer peripheral skeleton part 21, the lower end portion of the left oblique inner skeleton part 27, and a lower end portion of the left longitudinal inner skeleton part 24.

In this case, the left side portion of the lower stiffening plate 55 can include the outer junction 61, the inner junction 62, and the connecting stiffening plate portion 63, for example, as does the left stiffening plate 51 described above.

The outer junction 61 of the left side portion of the lower stiffening plate 55 may be joined to the outer portion of the outer peripheral skeleton part 21, the inner junction 62 may be joined, for example, between the lower end portion of the left oblique inner skeleton part 27 and the lower end portion of the left longitudinal inner skeleton part 24, and the connecting stiffening plate portion 63 may be joined to the lower end portion of the left oblique inner skeleton part 27.

Thus, even if the lower end portion of the left oblique inner skeleton part 27 is coupled with a step inside the outer peripheral skeleton part 21, the left oblique inner skeleton part can be joined to the outer portion of the outer peripheral skeleton part 21 through the left side portion of the lower stiffening plate 55.

Similarly, a right side portion of the lower stiffening plate 55 can include the outer junction 61, the inner junction 62, and the connecting stiffening plate portion 63, for example, as does the left stiffening plate 51 described above.

The outer junction 61 of the right side portion of the lower stiffening plate 55 may be joined to the outer portion of the outer peripheral skeleton part 21, the inner junction 62 may be joined, for example, between the lower end portion of the right oblique inner skeleton part 28 and the lower end portion of the right longitudinal inner skeleton part 25, and the connecting stiffening plate portion 63 may be joined to the lower end portion of the right oblique inner skeleton part 28.

Thus, even if the lower end portion of the right oblique inner skeleton part 28 is coupled with a step inside the outer peripheral skeleton part 21, the right oblique inner skeleton part can be joined to the outer portion of the outer peripheral skeleton part 21 through the right side portion of the lower stiffening plate 55.

The upper end portion of the left oblique inner skeleton part 27 is joined to the outer portion of the outer peripheral skeleton part 21 by the left stiffening plate 51, and the lower end portion is joined to the outer portion of the outer peripheral skeleton part 21 by the lower stiffening plate 55. The left oblique inner skeleton part 27 is formed inside the outer peripheral skeleton part 21, and both end portions thereof can be coupled to the outer portion of the outer peripheral skeleton part 21.

In such a modification, an effect of increasing the rigidity of the rear gate 10 similar to that of the above-described embodiment can be expected.

The invention claimed is:

1. A rear gate structure of a vehicle, the rear gate structure being configured to open and close a rear opening of a vehicle body of the vehicle, the rear gate structure comprising:

an outer panel constituting an outer surface of the vehicle by the rear gate;

an inner panel provided inside the vehicle with respect to the outer panel, at least the outer peripheral edge of the inner panel being joined to the outer panel;

an outer peripheral skeleton part formed on the inner panel along an outer peripheral edge of the inner panel;

an inner skeleton part formed on the inner panel so as to be coupled to the outer peripheral skeleton part inside the outer peripheral skeleton part; and a stiffening plate that overlaps a connecting portion between the outer peripheral skeleton part and the inner skeleton part, wherein the stiffening plate includes an outer junction, an inner junction, and a connecting stiffening plate portion between the outer junction and the inner junction, the outer junction overlaps the outer peripheral skeleton part, and is joined to the outer peripheral skeleton part, the inner junction is joined to the inner skeleton part, and the connecting stiffening plate portion is joined to the inner panel at the inner skeleton part.

2. The rear gate structure of the vehicle according to claim 1, wherein the inner panel comprises, in the outer peripheral skeleton part, an attachment part of a coupling member for supporting the rear gate to the vehicle, and the outer junction of the stiffening plate overlaps the attachment part and is screwed to the coupling member together with the attachment part.

3. The rear gate structure of the vehicle according to claim 2, wherein the coupling member is a cylinder member configured to support one of left and right edges of the rear gate on the vehicle body of the vehicle when the rear gate is opened, the inner skeleton part is an oblique inner skeleton part extending from a lower end central portion of the inner panel toward a side edge central portion of the inner panel, the connecting stiffening plate portion of the stiffening plate comprises an upper recess and a lower recess side by side vertically such that an upper edge connecting surface portion, the upper recess, a connecting bone portion, the lower recess, and a lower edge connecting surface portion are disposed side by side from a top to a bottom, and the connecting stiffening plate portion is joined to the oblique inner skeleton part of the inner panel in at least one of the upper recess and the lower recess.

4. The rear gate structure of the vehicle according to claim 3, wherein the outer junction of the stiffening plate is joined to the outer peripheral skeleton part of the inner panel in a portion on an extension of the upper edge connecting surface portion, a portion on an extension of the connecting bone portion, and a portion on an extension of the lower edge connecting surface portion of the connecting stiffening plate portion, and the inner junction of the stiffening plate is joined to portions of the inner panel inward from the oblique inner skeleton part in the portion on the extension of the upper edge connecting surface portion, the portion on the extension of the connecting bone portion, and the portion on the extension of the lower edge connecting surface portion of the connecting stiffening plate portion.

5. The rear gate structure of the vehicle according to claim 4, wherein the outer panel and the inner panel respectively have a first glass opening and a second glass opening in which a rear glass of the vehicle is disposed, and a first peripheral edge portion around the first glass opening and a second peripheral edge portion around the second glass opening are joined to each other, and the inner junction of the stiffening plate overlaps the second peripheral edge portion, and is joined to the inner panel at the second peripheral edge portion, so as to be joined to a portion of the inner panel inward from the oblique inner skeleton part.

6. The rear gate structure of the vehicle according to claim 5, wherein an auxiliary panel joined to the inner panel is provided around the second glass opening of the inner panel, and the inner junction of the stiffening plate overlaps a junction portion between the auxiliary panel and the inner panel, and is joined to the inner panel at the junction portion, so as to be joined to a portion of the inner panel inward from the oblique inner skeleton part.

7. The rear gate structure of the vehicle according to claim 6, wherein the outer peripheral skeleton part is annularly formed in the inner panel along an outer peripheral edge of the inner panel, and the stiffening plate overlapping the outer peripheral skeleton part comprises a left stiffening plate provided at a left edge portion of the annular outer peripheral skeleton part, a right stiffening plate provided at a right edge portion of the annular outer peripheral skeleton part, an upper left stiffening plate provided at an upper left corner portion of the annular outer peripheral skeleton part, an upper right stiffening plate provided at an upper right corner portion of the annular outer peripheral skeleton part, and a lower stiffening plate provided at a lower edge portion of the annular outer peripheral skeleton part, and at least the left stiffening plate and the right stiffening plate among the left stiffening plate, the right stiffening plate, and the lower stiffening plate overlap with a connecting portion between the outer peripheral skeleton part and the inner skeleton part, and comprise the outer junction, the inner junction, and the connecting stiffening plate portion.

8. The rear gate structure of the vehicle according to claim 1, wherein the coupling member is a cylinder member configured to support one of left and right edges of the rear gate on the vehicle body of the vehicle when the rear gate is opened, the inner skeleton part is an oblique inner skeleton part extending from a lower end central portion of the inner panel toward a side edge central portion of the inner panel, the connecting stiffening plate portion of the stiffening plate comprises an upper recess and a lower recess side by side vertically such that an upper edge connecting surface portion, the upper recess, a connecting bone portion, the lower recess, and a lower edge connecting surface portion are disposed side by side from a top to a bottom, and the connecting stiffening plate portion is joined to the oblique inner skeleton part of the inner panel in at least one of the upper recess and the lower recess.

9. The rear gate structure of the vehicle according to claim 8, wherein the outer junction of the stiffening plate is joined to the outer peripheral skeleton part of the inner panel in a portion on an extension of the upper edge connecting surface portion, a portion on an extension of the connecting bone portion, and a portion on an extension of the lower edge connecting surface portion of the connecting stiffening plate portion, and the inner junction of the stiffening plate is joined to portions of the inner panel inward from the oblique inner skeleton part in the portion on the extension of the upper edge connecting surface portion, the portion on the extension of the connecting bone portion, and the portion on the extension of the lower edge connecting surface portion of the connecting stiffening plate portion.

10. The rear gate structure of the vehicle according to claim 9, wherein the outer panel and the inner panel respectively have a first glass opening and a second glass opening in which a rear glass of the vehicle is disposed, and a first peripheral edge portion around the first glass opening and a second peripheral edge portion around the second glass opening are joined to each other, and the inner junction of the stiffening plate overlaps the second peripheral edge portion, and is joined to the inner panel at the second peripheral edge portion, so as to be joined to a portion of the inner panel inward from the oblique inner skeleton part.

11. The rear gate structure of the vehicle according to claim 10, wherein an auxiliary panel joined to the inner panel is provided around the second glass opening of the inner panel, and the inner junction of the stiffening plate overlaps a junction portion between the auxiliary panel and the inner panel, and is joined to the inner panel at the junction portion, so as to be joined to a portion of the inner panel inward from the oblique inner skeleton part.

12. The rear gate structure of the vehicle according to claim 11, wherein the outer peripheral skeleton part is annularly formed in the inner panel along an outer peripheral edge of the inner panel, and the stiffening plate overlapping the outer peripheral skeleton part comprises a left stiffening plate provided at a left edge portion of the annular outer peripheral skeleton part, a right stiffening plate provided at a right edge portion of the annular outer peripheral skeleton part, an upper left stiffening plate provided at an upper left corner portion of the annular outer peripheral skeleton part, an upper right stiffening plate provided at an upper right corner portion of the annular outer peripheral skeleton part, and a lower stiffening plate provided at a lower edge portion of the annular outer peripheral skeleton part, and at least the left stiffening plate and the right stiffening plate among the left stiffening plate, the right stiffening plate, and the lower stiffening plate overlap with a connecting portion between the outer peripheral skeleton part and the inner skeleton part, and comprise the outer junction, the inner junction, and the connecting stiffening plate portion.

13. The rear gate structure of the vehicle according to claim 1, wherein the stiffening plate is a separate plate sandwiched between the inner panel and the outer panel, and wherein the inner skeleton part is recessed in a vehicle outward direction relative to the outer peripheral skeleton part such that a bottom surface portion of the inner skeleton part and a bottom surface portion of the outer peripheral skeleton part are at different depths.

* * * * *